US012088357B2

(12) United States Patent
Buthler et al.

(10) Patent No.: US 12,088,357 B2
(45) Date of Patent: Sep. 10, 2024

(54) PERFORMING RADIO CHANNEL MEASUREMENTS

(71) Applicant: NOKIA TECHNOLOGIES OY, Espoo (FI)

(72) Inventors: Jakob Lindbjerg Buthler, Aalborg (DK); Mads Lauridsen, Gistrup (DK); Faranaz Sabouri-Sichani, Aalborg (DK); Daniela Laselva, Klraup (DK)

(73) Assignee: Nokia Technologies Oy, Espoo (FI)

(*) Notice: Subject to any disclaimer, the term of this patent is extended or adjusted under 35 U.S.C. 154(b) by 344 days.

(21) Appl. No.: 17/596,657

(22) PCT Filed: Jun. 20, 2019

(86) PCT No.: PCT/EP2019/066355
§ 371 (c)(1),
(2) Date: Dec. 15, 2021

(87) PCT Pub. No.: WO2020/253962
PCT Pub. Date: Dec. 24, 2020

(65) Prior Publication Data
US 2022/0286212 A1  Sep. 8, 2022

(51) Int. Cl.
*H04B 17/318* (2015.01)
*H04B 17/373* (2015.01)
(Continued)

(52) U.S. Cl.
CPC ......... *H04B 17/318* (2015.01); *H04B 17/373* (2015.01); *H04B 17/382* (2015.01); *H04W 72/0453* (2013.01)

(58) Field of Classification Search
CPC .. H04B 17/318; H04B 17/373; H04B 17/382; H04W 72/0453
See application file for complete search history.

(56) References Cited

U.S. PATENT DOCUMENTS

2005/0032520 A1   2/2005  Muller
2010/0208604 A1*  8/2010  Kazmi ................. H04W 36/24
                                                370/252
(Continued)

FOREIGN PATENT DOCUMENTS

CN         103370963 A        10/2013
WO    WO-2018063073 A1  *   4/2018    ............ H04W 24/10

OTHER PUBLICATIONS

International Search Report and Written Opinion for International Application No. PCT/EP2019/066355, mailed on Feb. 18, 2020, 15 pages.

(Continued)

*Primary Examiner* — Mohammad S Anwar
(74) *Attorney, Agent, or Firm* — Brake Hughes Bellermann LLP

(57) ABSTRACT

There is provided controlling radio channel measurements on radio channels of different wireless networks. A wireless communication device performs first radio channel measurements on a first radio channel of a first wireless communication network and second radio channel measurements on at least one second radio channel of a second wireless communication network. It is determined, on the basis of the first radio channel measurements and the second radio channel measurements, a relationship between the first radio channel and the at least one second radio channel. Measurement activity of the at least one second radio channel is controlled on the basis of at least the determined relationship and the first radio channel measurements.

29 Claims, 10 Drawing Sheets

(51) Int. Cl.
*H04B 17/382* (2015.01)
*H04W 72/0453* (2023.01)

(56) References Cited

U.S. PATENT DOCUMENTS

2014/0003259 A1   1/2014  Chin et al.
2016/0338137 A1*  11/2016 Mishra ................ H04W 36/08

OTHER PUBLICATIONS

3GPP TSG-RAN WG2 Meeting #106, R2-1905937; "Discussion on Power Saving in Inter-Frequency Measurements"; Source: CMCC; Agenda Item: 11.11.5; Reno, Nevada, USA; May 12-16, 2019; 6 pages.
Office Action and Search Report for Chinese Patent Application No. 201980097663.0, mailed on Jan. 19, 2024, 11 pages.
Office Action for European Patent Application No. 19734012.8, mailed on Feb. 22, 2024, 4 pages.

* cited by examiner

PERFORMING RADIO CHANNEL MEASUREMENTS

CROSS-REFERENCE TO RELATED APPLICATIONS

This application is a national stage entry of International Application No. PCT/EP2019/066355, filed Jun. 20, 2019, entitled "PERFORMING RADIO CHANNEL MEASUREMENTS" which is hereby incorporated by reference in its entirety.

FIELD

The present invention relates to performing radio channel measurements on radio channels of different wireless networks.

BACKGROUND

Wireless communication devices perform radio resource measurements for maintaining their radio connections. The radio resource measurements provide signal level and signal quality information for facilitating transmission power control, selecting modulation and coding method used on the radio connections, handover procedures and beam management. The radio resource measurements may be performed frequently particularly when the radio channel of the wireless communications is changing such that the wireless communication device may be adapted to the changes in the radio channel. Performing the radio resource measurements consume power, which limits power saving possibilities of the wireless communication device, contributing to reduce e.g. the device battery standby time, and hence contributing to power outage situations in a wireless communication device with a limited power supply. Since the radio resource measurements are performed for each radio connection, the power consumption of the radio resource measurements can become a significant factor particularly in modern wireless communication devices such as smartphones, where multiple radio connections may be available and co-exist.

SUMMARY

The scope of protection sought for various embodiments of the invention is set out by the independent claims. The embodiments, examples and features, if any, described in this specification that do not fall under the scope of the independent claims are to be interpreted as examples useful for understanding various embodiments of the invention.

According to a first aspect there is provided a wireless communication device, comprising means for performing first radio channel measurements on a first radio channel of a first wireless communication network and second radio channel measurements on at least one second radio channel of a second wireless communication network, means for determining, on the basis of the first radio channel measurements and the second radio channel measurements, a relationship between the first radio channel measurements and the at least one second radio channel measurements, means for controlling a measurement activity of the at least one second radio channel on the basis of at least the determined relationship and the first radio channel measurements.

According to a second aspect there is provided a method comprising performing first radio channel measurements on a first radio channel of a first wireless communication network and second radio channel measurements on at least one second radio channel of a second wireless communication network, determining, on the basis of the first radio channel measurements and the second radio channel measurements, a relationship between the first radio channel measurements and the at least one second radio channel measurements, controlling a measurement activity of the at least one second radio channel on the basis of at least the determined relationship and the first radio channel measurements.

According to a third aspect there is provided a computer program comprising computer readable program code means adapted to perform the method according to a method according to aspect when said program is run on a computer.

According to a fourth aspect there is provided a computer program embodied on a computer readable medium.

According to a fifth aspect, there is provided an apparatus comprising at least one processing core, at least one memory including computer program code, the at least one memory and the computer program code being configured to, with the at least one processing core, cause the apparatus performing first radio channel measurements on a first radio channel of a first wireless communication network and second radio channel measurements on at least one second radio channel of a second wireless communication network, determining, on the basis of the first radio channel measurements and the second radio channel measurements, a relationship between the first radio channel measurements and the at least one second radio channel measurements, controlling a measurement activity of the at least one second radio channel on the basis of at least the determined relationship and the first radio channel measurements.

Various embodiments of one or more of the above aspects may comprise at least one feature from the following bulleted list:
- determining at least one property of the determined relationship; and controlling the measurement activity of the at least one second radio channel, if the determined property meets at least one criterion
- the at least one property comprises an error level of second radio channel measurement values estimated on the basis of the determined relationship
- determining a deviation between the second radio channel measurements and the second radio channel measurement values estimated on the basis of the relationship; determining whether the second radio channel measurements are in accordance with the relationship based on the determined deviation and the error level
- relaxing a measurement activity of the at least one second radio channel on the basis of at least the determined relationship and the first radio channel measurements
- increasing the measurement activity of the at least one second radio channel on the basis of at least the determined relationship and the first radio channel measurements
- determining whether one or more of the second radio channel measurements are in accordance with the determined relationship, and if they are, maintaining the measurement activity of the at least one second radio channel at a current level of the measurement activity, if they are not, updating the determined relationship
- determining a mobility status of the wireless communication device on the basis of the determined relationship and at least one of the first radio channel measurements and the at least one second radio channel measurements; wherein whether the one or more of the performed second radio channel measurements are in accordance with the determined relationship is determined on the basis of the mobility status estimating one or more second radio channel measurement values on the basis of the determined relationship and the first radio channel measurements; determining, a change in at least one of signal level and quality of the second radio channel; and controlling the measurement activity of the at least one second radio channel on the basis of the determined change.

determining whether to control the measurement activity of the at least one second radio channel on the basis of the determined change controlling the measurement activity if one or more estimated second radio channel measurement values meet an absolute threshold the measurement activity comprises at least one of a periodicity of the second radio channel measurements, a number of neighboring cells to measure by the second radio channel measurements, a number of beams to measure by the second radio channel measurements and a number of frequency carriers to measure by the second radio channel measurements the measurement activity is determined based on a state of a radio resource management protocol receiving from a wireless communication network over at least one of the first radio channel and the at least one second radio channel an indication comprising one or more of: information indicating the at least one second radio channel and the first radio channel; information related to the relationship; information for controlling the measurement activity of the at least one second radio channel on the basis of the determined relationship; and information for controlling a measurement reporting activity of the at least one second radio channel on the basis of the determined relationship the wireless communication device comprises a first user equipment configured to connect over the first radio channel to the first wireless communication network and a second user equipment configured to connect over the at least one second radio channel to the second wireless communication network the first wireless communication network and the second wireless communication network are of the same network the wireless communication device is connected over the first radio channel to a master cell of the first wireless communication network and over the second radio channel to a secondary cell of the second wireless communication network.

BRIEF DESCRIPTION OF DRAWINGS

Some example embodiments will now be described with reference to the accompanying drawings.

EMBODIMENTS

In connection with a wireless communication device capable of communications on at least two radio channels, first radio channel measurements are performed on a first radio channel and second radio channel measurements are performed on at least one second radio channel. A relationship between the first radio channel and the at least one second radio channel is determined based on the first radio channel measurements and the second radio channel measurements. A measurement activity of the at least one second radio channel is controlled on the basis of at least the determined relationship and the first radio channel measurements. In this way measurement activities of the wireless communication device performed over at least two radio channels of different wireless communication networks may be controlled.

It should be appreciated that in the description of the embodiments, a first radio channel may be referred to a reference radio channel and a second radio channel may be referred to an associated radio channel.

Figure 1:
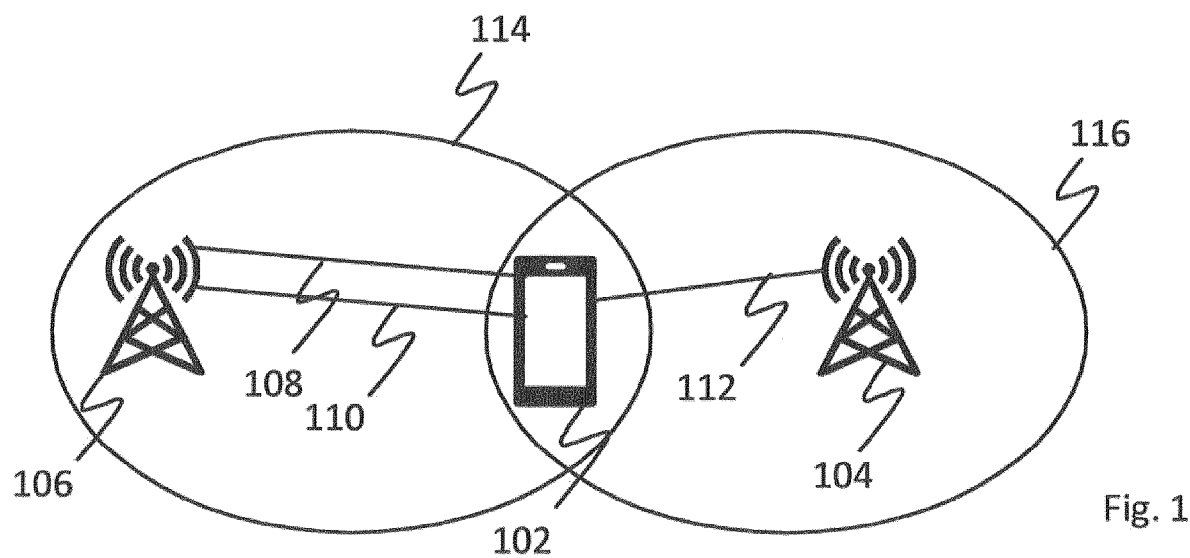
FIG. 1 illustrates an example of a communication system in accordance with at least some embodiments of the present invention.

FIG. 1 illustrates an example of a communication system in accordance with at least some embodiments of the present invention. The communication system 100 may comprise one or more wireless communication devices 102 that may be configured to communicate with one or more wireless communication networks 104,106 over radio channels 108, 110,112.

Examples of the wireless communication device 102 shown in the system 100 may include, but are not limited to, an electronic device, user equipment (UE) or apparatus, a combination of a Personal Digital Assistant (PDA) and a mobile telephone 14, a PDA 16, an integrated messaging device (IMD) 18, a desktop computer 20, a notebook computer 22. The wireless communication devices may be stationary or mobile when carried by an individual who is moving. The wireless communication devices may also be located in a mode of transport including, but not limited to, a car, a truck, a taxi, a bus, a train, a boat, an airplane, a bicycle, a motorcycle or any similar suitable mode of transport.

User Equipment (UE) may be a device allowing a user access to services of the wireless communication network of an operator over a radio interface. According to an example architecture of the UE, the UE may comprise a Mobile Equipment (ME) domain for performing radio transmission and comprising applications and a User Services Identity Module (USIM) domain. The ME domain comprises entities for performing radio transmission and related functions, and end-to-end application. The USIM contains data and procedures which unambiguously and securely identify itself.

A wireless communication network may comprise one or more access nodes or base stations that provide wireless coverage in coverage areas of the access nodes or base stations. Mobile communication devices located within the coverage areas may be connected over radio channels to one or more cells provided by the access nodes or base stations of the wireless communication networks. The cells may be identified by cell identifiers. Different wireless communication networks may be of the same network at least when they are identified by the same network identifier, e.g. a Public Land Mobile Network (PLMN) identifier.

The wireless communication device and wireless communication networks may implement one or more Radio Access Technologies (RATs) for communications over the radio channels 108,110,112. Examples of the RATs comprise, but are not limited to, 5th Generation mobile network New Radio (5G NR), Long Term Evolution (LTE), Code Division Multiple Access (CDMA), Global System for Mobile communications (GSM), Universal Mobile Telecommunications System (UMTS), Bluetooth and IEEE 802.11 and any similar wireless communication technology.

In an embodiment, a wireless communication device 102 comprises one user equipment configured to connect over one radio channel to one wireless communication network 104 and a second user equipment configured to connect over another radio channel to another wireless communication network 106. In this way the wireless communication device may be configured to serve as user equipment in wireless communication networks of one or more operators.

It should be appreciated that the wireless communication networks may be of the same network. The wireless communication networks may be of the same at least, when the networks are owned by the same operator.

Different wireless communications networks may be identified by corresponding network identifiers, e.g. Public Land Mobile Network Identifiers (PLMN IDs). A radio channel may refer to a communication link between the wireless communication device 102 and the wireless communication network 104,106. The communication link may be established between the wireless communication device 102 and the wireless communication network 104,106, when the wireless communication device is located within a coverage area 114,116 or cell of the wireless communication network. The coverage area may be provided by an access node or base station of the wireless communication network. The wireless communication device may be connected to the access node of the wireless communication network over one or more radio channels 108,110,112.

A connection between the wireless communication device 102 and the wireless communication network 104,106 may comprise one or more radio channels for communications of user data and/or signaling. Accordingly, the connection may be a user plane connection for communications of user data or a control plane connection for communications of signaling. The connection may be an uplink connection from the wireless communication device to the wireless communication network and/or a downlink connection from the wireless communication network to the wireless communication device. The radio channel may comprise resources that are allocated for communications of the user data and/or signaling on radio frequencies of a radio frequency band. The radio frequency band may be a radio frequency band according to the RAT used on the radio channel, for example.

In an example, the connection between the wireless communication device 102 and the wireless communication network 104,106 may comprise a radio resource management connection. The radio resource management connection may be according to a radio resource management protocol. The radio resource management protocol may comprise states that determine operation of a wireless communication device executing the radio resource management protocol. For example, energy consumption of the wireless communication device may be different in different states of the radio resource management protocol. Accordingly, the wireless communication device may have a higher power consumption in one state than in another state. Examples of the states comprise at least an active state and a less active state, e.g. an idle state.

In an example, a radio resource management connection may be a Radio Resource Control (RRC) protocol connection. The operation of the RRC protocol is guided by a state machine which defines certain specific states that a UE may be present in, an RRC connection with the wireless communications network. The RRC state machine defines the RRC state of a UE also for UEs who do not have an RRC connection established. A state of UE that does not have RRC connection is referred to as RRC idle. The different states in this state machine have different amounts of radio resources associated with them and these are the resources that the UE may use when it is present in a given specific state. Since different amounts of resources are available at different states the quality of the service that the user experiences and the energy consumption of the UE are influenced by this state machine. Examples of states in the state machine may comprise an RRC connected state, RRC idle state and RRC inactive state. The wireless communication device 102 may be capable of establishing radio channels to different wireless communication networks 104, 106. In the following, when the wireless communication device has two or more radio channels for communication with different wireless communication networks, one of the radio channels may be referred to a reference radio channel and one or more further radio channels may be referred to associated radio channels. Accordingly, the reference radio channel may be between the wireless communication device and one wireless communication network and the associated radio channel may be between the wireless communication device and one or more other wireless communication networks. The reference radio channel may be determined by the wireless communication device independently or based on an indication from at least one of the communication networks.

An associated radio channel may be at least a radio channel associated to a reference radio channel. The associated radio channel and reference radio channel may be established at the same wireless communications device. The reference radio channel and one or more associated radio channels may be between the wireless communications device 102 and at least two different wireless communications networks 104,106, whereby the reference radio channel may be between the wireless communication device and one wireless communications network 104 and at least one associated radio channel may be between the wireless communication device and another wireless communications network 106. Since the associated radio channel and reference radio channel may be established at the same wireless communications device, a movement of the wireless communications device affects properties of both the associated radio channel and the reference radio channel.

In an embodiment, the wireless communication device 102 is connected over a reference radio channel to a master cell of one wireless communication network and over an associated radio channel to a secondary cell of another wireless communication network.

In an example, the wireless communication device 102 may have at least two radio channels to different wireless communication networks, when the communication system supports Dual Connectivity (DC). In such a case the wireless communication device may be connected over one radio channel, a reference radio channel, to a master cell of one wireless communication network 104 and over another radio channel, an associated radio channel, to a secondary cell of another wireless communication network 106. The wireless communication device may have a radio resource management connection, e.g. an RRC connection, to both of the wireless communication networks. Therefore, the wireless communication device may be in RRC connected state to both wireless communication networks. In an example, the wireless communication device 102 may have at least two radio channels to different wireless communication networks, when the wireless communication device is a Multi-SIM device. The Multi-SIM device supports simultaneous operation, at least in idle mode, as a UE in different wireless communication networks 104,106. The Multi-SIM wireless communication device may have UE identifiers for each of the wireless communication networks, which allows the Multi-SIM device to be reached via the different wireless communication networks. The different wireless communication networks may be provided by the same operators or by different operators. When the different wireless communication networks are provided by the same operator the different wireless communication networks may be of the same network. A single base station site or separate base station sites may be used to provide services of the wireless communication networks. Accordingly, the different wireless communications networks may be provided by the same or different cells of an access node or a base station. The Multi-SIM device may comprise separate Radio Frequency (RF) parts for each SIM or the at least part of the RF hardware may be shared between the SIMs. The wireless communication network for providing the reference radio channel and associated radio channels may be determined by the Multi-SIM device independently or by assistance from at least one of the wireless communication networks.

In an example, a Multi-Sim device comprises one UE for each wireless communication network. The wireless communication networks may be provided by the same or different cells of an access node or a base station. When, provided by a single cell, characteristics of the radio channels to the wireless networks are the same, whereby at least in some embodiments described herein the, radio channel measurements may be relaxed such that radio channel measurements are performed only on one of the radio channels.

In an example, the wireless communication device 102 may have at least two radio channels according to different RATs to different wireless communication networks. The RATs may comprise for example IEEE 802.11 and at least one of the other RATs described above, for example a cellular RAT such as LTE or 5G NR. Then, a reference radio channel may be determined to be the radio channel according to the IEEE 802.11 and radio channels according to the other RATs may be associated radio channels. On the other hand, also another configuration of RATs for the reference radio channel and the associated radio channels may be used.

The wireless communication device 102 may be configured to perform Radio Resource Management (RRM) measurements or radio channel measurements. The RRM measurements or radio channel measurements provide that a connection over a radio channel between the wireless communication device 102 and the wireless communication network 104,106 may be maintained for successful communications between the wireless communication device 102 and the wireless communication network 104,106. The RRM measurements may be performed continuously and/or periodically by the wireless communication device. A relationship may be determined between the reference radio channel and one or more associated radio channels by performing the radio channel measurements on the reference radio channel and the associated radio channels. The relationship may comprise a spatial and/or time relationship, i.e. relative variations of the radio channels in space and/or in time. The relationship may have one or more statistical properties which determines/states the accuracy of the estimated associated radio channel measurements. The statistical property may be referred to as an error level, as it denotes the variation of the estimate from an actual measurement. This error rate may be defined for instance by a standard deviation or a mean error.

Examples of the radio channel measurements comprise a Reference Signal Received Power (RSRP) measurement and Reference Signal Received Quality (RSRQ) measurement. The RSRP measurement may provide measurement value of received power of cell-specific reference signals transmitted by the wireless communication network. The RSRQ measurement may provide measurement value of a relation between N times the RSRP value divided by the total received power in the radio channel bandwidth. The RSRQ considers also noise and interference contributions. In an embodiment a measurement activity comprises at least one of a periodicity of the associated radio channel measurements, a number of neighboring cells to measure by the second radio channel measurements, a number of beams to measure by the associated radio channel measurements and a number of frequency carriers to measure by the associated radio channel measurements. The periodicity may refer to a time period between subsequent radio channel measurements. A relaxed level of the measurement activity may be an increased periodicity of the radio channel measurements and/or a lower number of neighboring cells measured by the radio channel measurements. Accordingly, the relaxed measurement activity may define a reduced amount of radio channel measurements at least compared with a non-relaxed measurement activity.

In an example, the relaxed measurement activity may be applied to a set of radio channels. The set of radio channels may comprise associated radio channels. The set of radio channels may comprise all the associated radio channels of the wireless communication device or the radio channels of the wireless communication device may comprise a plurality of sets of radio channels, whereby the relaxed measurement activity may be applied to a part of the sets. Each radio channel may have its own radio channel measurements and a measurement activity of the radio channel measurements. When the relaxed measurement activity is applied to the set of associated radio channels, the measurement activities of all the radio channels in the set of radio channels may be relaxed to the relaxed measurement activity specific to each radio channel. On the other hand, a measurement activity of associated radio channels that do not belong to the set may be maintained.

In an example in accordance with at least some embodiments, during the relaxed measurement activity of the at least one associated radio channel, power consumption of the associated radio channel measurements is reduced with respect to the power consumption of the associated radio channel measurements for determining the relationship.

Figure 2A:
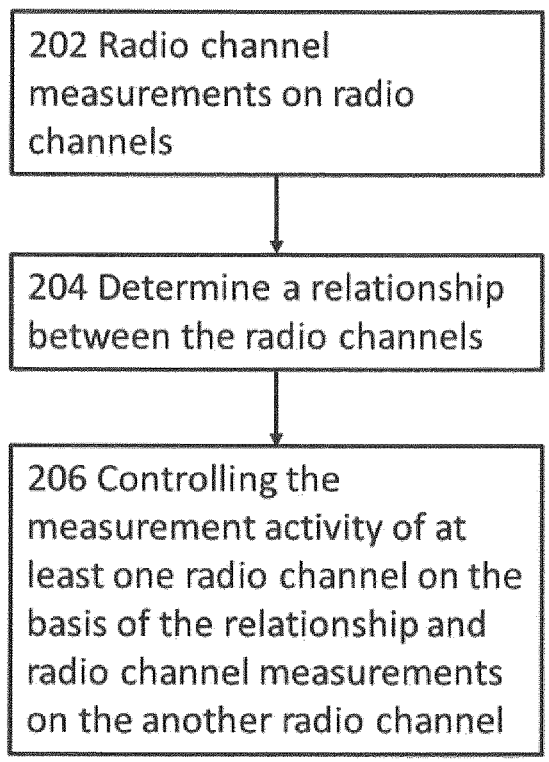
FIG. 2*a* illustrates an example of a method in accordance with at least some embodiments of the present invention.

FIG. 2a illustrates an example of a method in accordance with at least some embodiments of the present invention. The method may be performed by a wireless communication device described with FIG. 1 for example. The method provides controlling measurement activities of the wireless communication device performed over at least two radio channels to different wireless communications network.

Phase 202 comprises performing first radio channel measurements on a reference radio channel of a reference wireless communication network and associated radio channel measurements on at least one associated radio channel of an associated wireless communication network.

It should be appreciated that the reference radio channel measurements may be performed using a measurement activity for the reference radio channel and the associated radio channel measurements may be performed using a measurement activity for the associated radio channel.

Phase 204 comprises determining, on the basis of the reference radio channel measurements and the associated radio channel measurements, a relationship between the reference radio channel and the at least one associated radio channel. The relationship provides that associated radio channel measurements may be estimated using the reference radio channel measurements, whereby a measurement activity on the associated radio channel may be controlled.

Phase 206 comprises controlling a measurement activity of the at least one associated radio channel on the basis of at least the determined relationship and the reference radio channel measurements.

In an embodiment phase 206 comprises relaxing a measurement activity of the at least one associated radio channel on the basis of at least the determined relationship and the reference radio channel measurements. In this way the power consumption due to radio channel measurements on the at least one associated radio channel may be reduced.

In an embodiment, phase 206 comprises increasing the measurement activity of the at least one associated radio channel on the basis of at least the determined relationship and the reference radio channel measurements.

In an embodiment phase 206 comprises controlling the measurement activity if one or more estimated associated radio channel measurement values meet an absolute threshold.

In an example of phase 206, the estimated second radio channel measurement values may be determined based on the relationship and reference radio channel measurements. Then if estimated second radio channel measurement values an absolute threshold, the measurement activity may be controlled. The absolute threshold may be an absolute signal quality or signal level.

It should be appreciated that during a relaxed measurement activity of the at least one associated radio channel phase 206 comprises that the measurement activity of the at least one associated radio channel may be decreased or increased. In an example, increasing the measurement activity comprises decreasing a periodicity of the radio channel measurements and/or increasing a number of neighboring cells measured by the radio channel measurements. In an example, decreasing the measurement activity comprises increasing a periodicity of the radio channel measurements and/or decreasing a number of neighboring cells measured by the radio channel measurements.

Figure 2B:
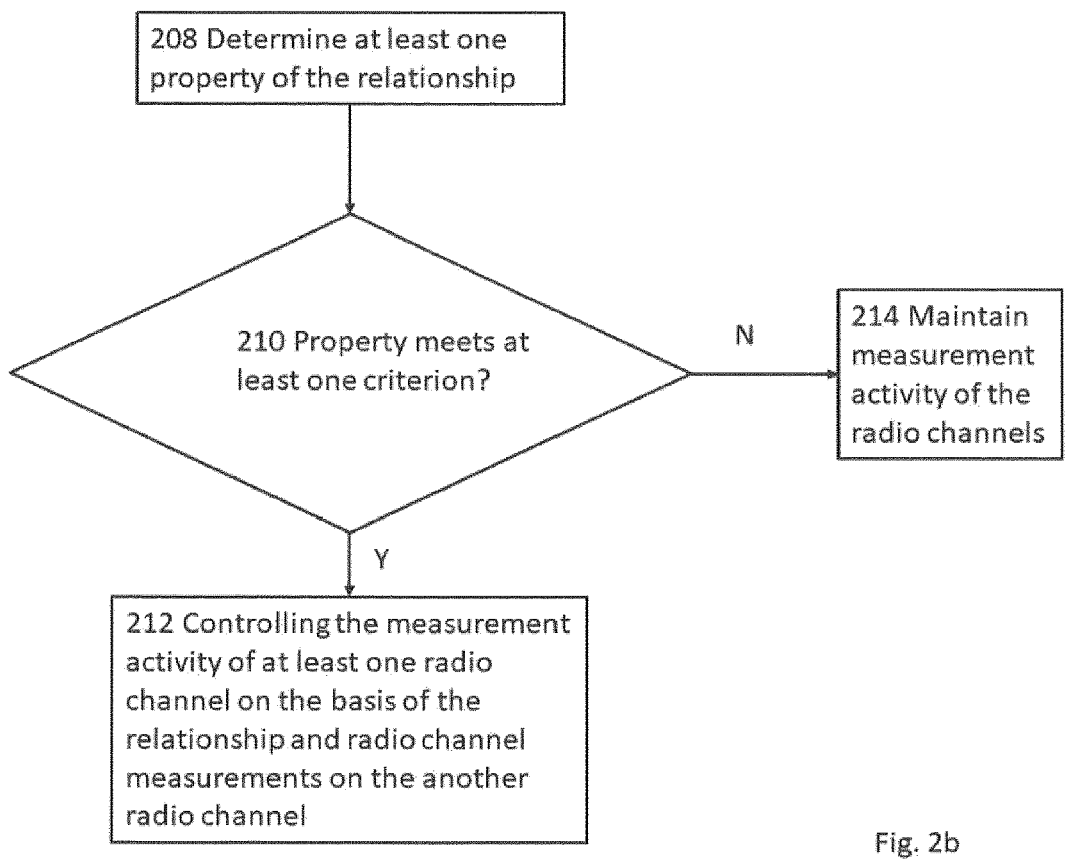
FIG. 2*b* illustrates an example of a method in accordance with at least some embodiments of the present invention.

FIG. 2b illustrates an example of a method in accordance with at least some embodiments of the present invention. The method provides controlling whether a relationship determined between a reference radio channel and at least one associated radio channel is valid for controlling a measurement activity of the at least one associated radio channel. The method may be performed after phase 204 in FIG. 2a for example.

Phase 208 comprises determining at least one property of the determined relationship.

Phase 210 comprises determining if the determined property meets at least one criterion. If the at least criterion is met, the method may proceed to phase 212 that comprises controlling the measurement activity of the at least one associated radio channel, in accordance with phase 206 of FIG. 2a. In this way a measurement activity of the at least one associated radio channel may be changed. If the at least criterion is not met, the method may proceed to phase 214 that comprises performing radio channel measurements on the reference radio channel and the at least one associated radio channel in accordance with phase 202 of FIG. 2a. In this way the measurement activities of the radio channels may be maintained unchanged.

In an example, the at least property may be an error level of estimated associated radio channel measurement values. In an example the error level may be determined to align with or not to exceed a defined, e.g. by 3GPP, measurement accuracy. Then, phase 208 comprises determining, on the basis of the determined relationship, deviation between the second radio channel measurements and the second radio channel measurement values estimated on the basis of the relationship. In an example the associated radio channel measurement values may be estimated on the basis of the relationship and the reference radio channel measurements performed during a relaxed measurement activity of the at least one associated radio channel. Phase 210 comprises determining whether the determined relationship is valid on the basis of the deviation and the error level. If the relationship is valid, the method may proceed to phase 212 comprising determining to control the measurement activity of the at least one associated radio channel on the basis of at least the determined relationship and the reference radio channel measurements. If the relationship is not valid, the method may proceed to phase 214. Validity may also be determined if the error level and the estimated measurements exceed a threshold. This threshold may be a power or interference limitation set by example from the network.

Figure 3:
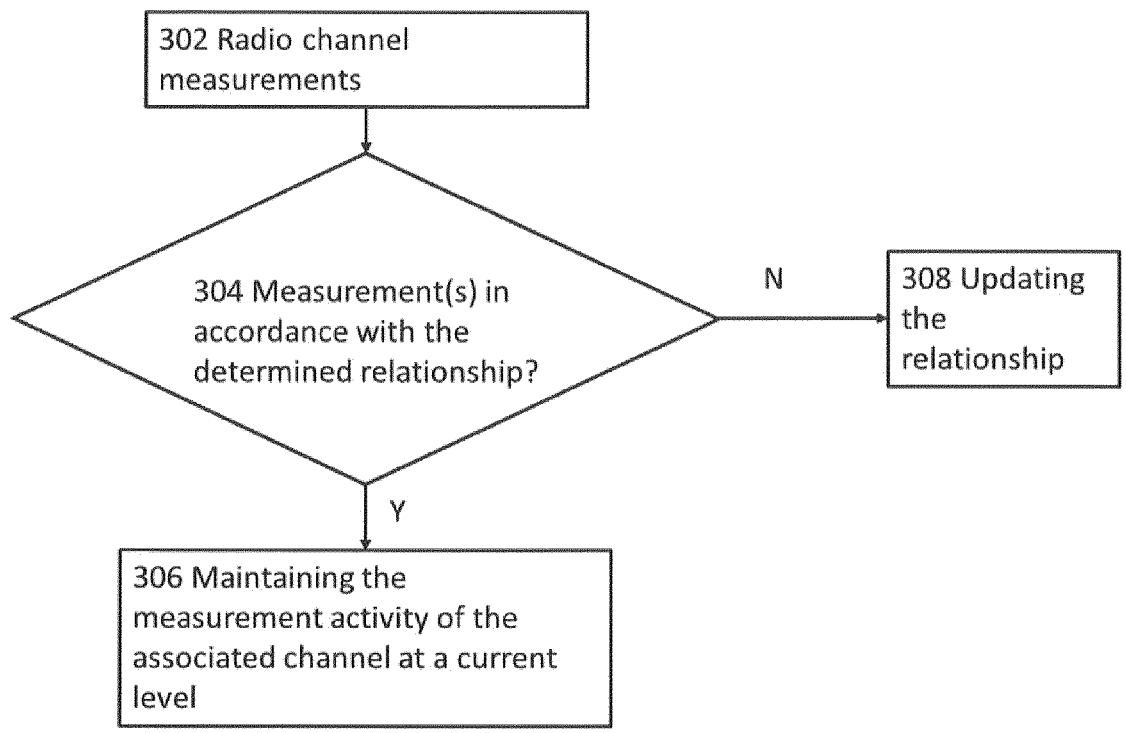
FIG. 3 illustrates an example of a method for controlling a measurement activity in accordance with at least some embodiments of the present invention.

FIG. 3 illustrates an example of a method for controlling a measurement activity in accordance with at least some embodiments of the present invention. The method may be performed by a wireless communication device described with FIG. 1 for example. The method provides that a relationship between a reference radio channel and at least one associated radio channel may be updated, when needed.

Phase 302 comprises performing associated radio channel measurements on at least one associated radio channel.

In an example phase 302 comprises performing associated radio channel measurements on at least one associated radio channel during a relaxed measurement activity of the at least one associated radio channel. The measurement activity may be relaxed for example as described in phase 206 of FIG. 2a.

Phase 304 comprises determining whether one or more of the performed associated radio channel measurements are in accordance with a relationship between a reference radio channel and the at least one associated radio channel. The relationship may be determined in accordance with phase 204 of FIG. 2a, for example.

In an example, phase 403 comprises determining a deviation between one or more associated radio channel measurements and one or more estimated associated radio channel measurement values. An estimated associate radio channel measurement value may be determined on the basis of the relationship and reference radio channel measurements. compared to the estimate. It should be noted that if the relationship is based on unfiltered associated and reference radio channel measurements, some sort of filtering may be imposed during the calculation of the relationship.

Phase 306 comprises, if the associated radio channel measurements are in accordance with the determined relationship, the measurement activity of the at least one associated radio channel is maintained at a current level of the measurement activity. In an example the current level of the measurement activity may be a relaxed level of the measurement activity.

Phase 308 comprises, if the associated radio channel measurements are not in accordance with the relationship, updating the determined relationship.

In an example, updating the determined relationship comprises that the relationship may be determined anew, initialized or partially changed for performing relaxed associated radio channel measurements. The relationship may be determined a new for example in accordance with the phases of the method of FIG. 2a. Accordingly, it should be appreciated, phase 308 comprises that the current measurement activity of the associated radio channel measurements is changed, at least when the current measurement activity is a relaxed measurement activity. The changed measurement activity of the associated radio channel measurements may be determined suitable for updating the relationship. In an example, the changed measurement activity may be determined based on a state of a radio resource management protocol of the radio channel.

In an embodiment phase 302 comprises determining a mobility status of the wireless communication device on the basis of the determined relationship and at least one of the reference radio channel measurements and the at least one associated radio channel measurements. Then, phase 304 comprises determining whether the performed associated radio channel measurements are in accordance with the determined relationship on the basis of the mobility status. In this way, when the mobility status indicates a change in a mobility status of the wireless communication device, the method may proceed to updating the relationship in phase 308 even if the performed associated radio channel measurements would be in accordance with the relationship. Examples of the change of the mobility status of the wireless communication device may comprise that the wireless communication device starts to move after being stationary and a direction of movement of the wireless communication device is changed. The change of the mobility status may be determined on the basis of the determined relationship between the reference radio channel measurements and the associated radio channel measurements, and the performed reference radio channel measurements and the associated radio channel measurements.

Figure 4:
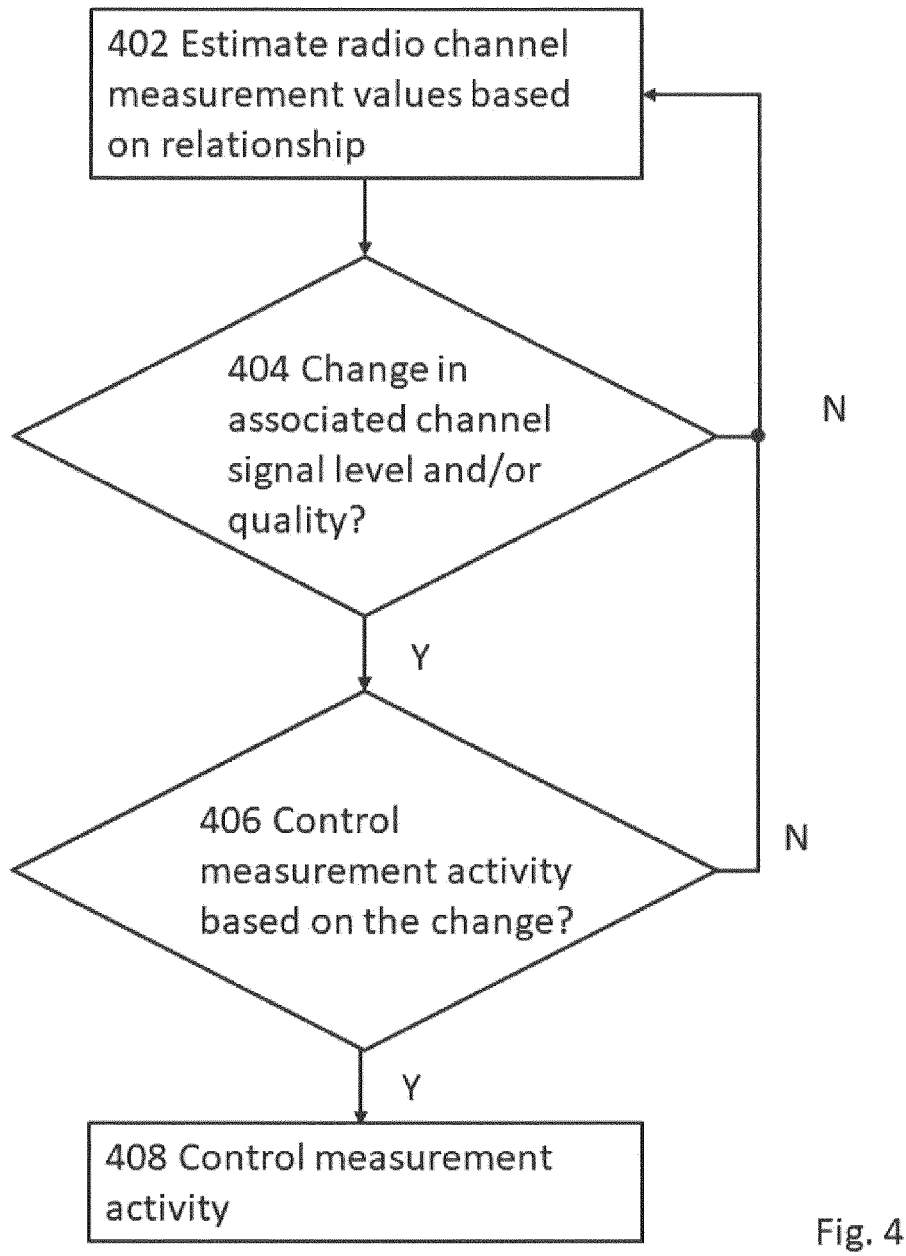
FIG. 4 illustrates an example of a method for controlling a measurement activity in accordance with at least some embodiments of the present invention.

FIG. 4 illustrates an example of a method for controlling a measurement activity in accordance with at least some embodiments of the present invention. The method may be performed by a wireless communication device described with FIG. 1 for example. The method provides that an estimated associated channel signal level and/or quality may be used for controlling the measurement activity of the associated channel.

Phase 402 comprises estimating one or more associated radio channel measurement values on the basis of the relationship and the reference radio channel measurements.

In an example of phase 402, the reference radio channel measurements may be performed during a relaxed measurement activity of the at least one associated radio channel.

In an example phase 402 comprises averaging and/or filtering the reference radio channel measurements.

Phase 404 comprises determining, a change in at least one of signal level and quality of the associated radio channel. If the change is not determined in phase 404, the method may proceed to phase 402, where further estimates of the associated radio channel measurement values may be generated. If the change is determined in phase 404, the method may proceed directly to phase 408 comprising controlling the measurement activity of the at least one associated radio channel on the basis of the determined change.

In an example phase 404 comprises that the change is determined on the basis of one or more associated radio channel measurements or estimated associated radio channel measurement values.

In an embodiment, if the change is determined in phase 404, the method may proceed to phase 408 via phase 406 comprising, determining whether to control the measurement activity of the at least one associated radio channel on the basis of the determined change. In an example phase 406 comprises evaluating the change by comparing the change with a threshold value for the change. Then, if the change meets the threshold value for the change, the change may be determined positively, and the method may proceed to phase 408. If the if the change does not meet the threshold value for the change, the method may proceed to phase 402.

In an example, phase 406 may comprise determining to control the measurement activity on the basis of one or more of: estimated radio channel measurement values, error level of estimated radio channel measurement values, a change of radio channel. The estimated radio channel measurement values, the error level and the change of radio channel may be determined by comparing the estimated radio channel measurement values and/or the error level to corresponding thresholds.

Figure 5:
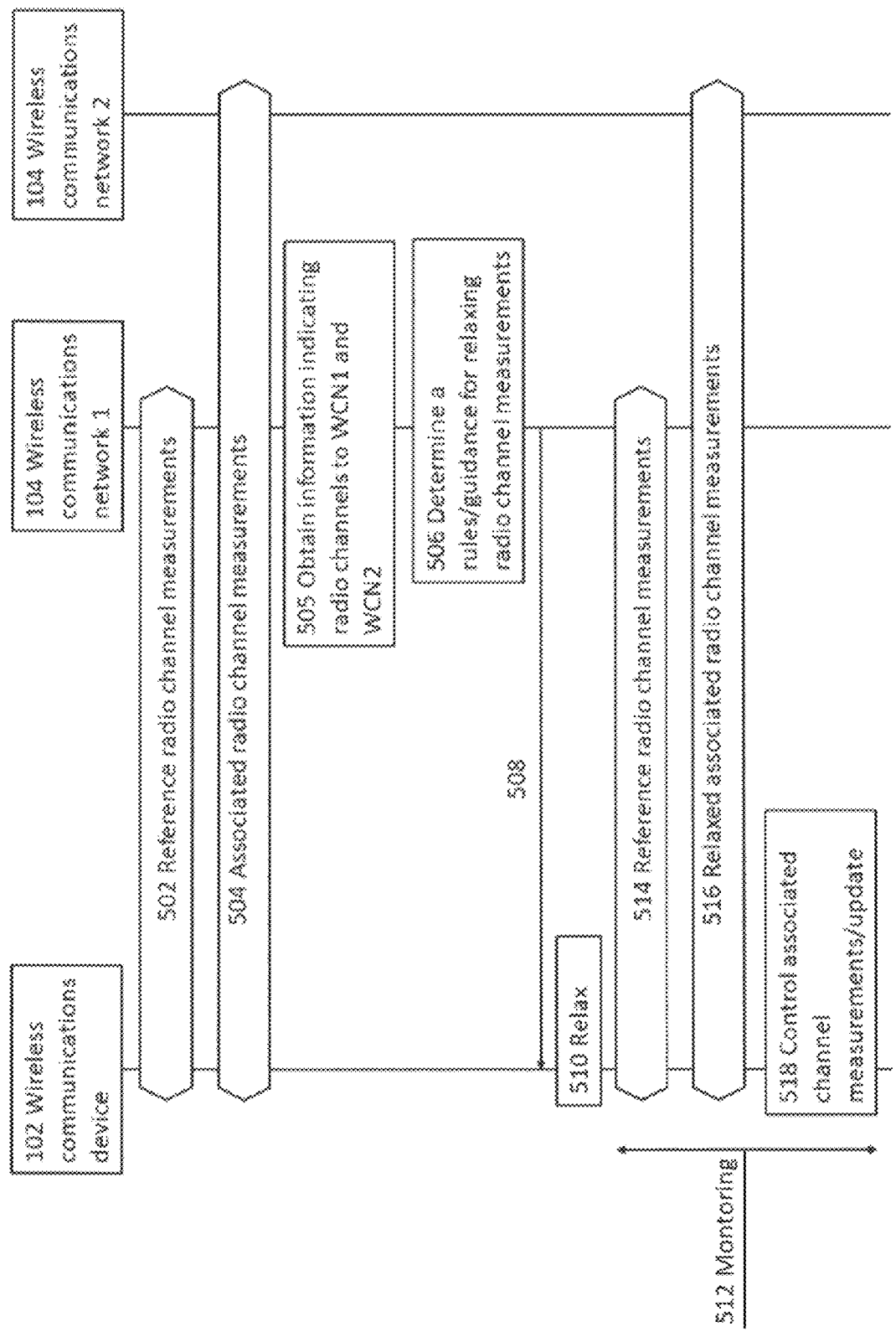
FIG. 5 illustrates an example of a sequence in accordance with at least some embodiments of the present invention.

FIG. 5 illustrates an example of a sequence in accordance with at least some embodiments of the present invention. The sequence is described with reference to a wireless communication device 102 and wireless communication networks 104, 106 of the communication system described with FIG. 1. The wireless communication device is connected by two radio channels to different wireless communication networks. The wireless communication device may be caused to execute one or more of the methods in accordance with at least some embodiments.

Phase 502 comprises the wireless communication device performing reference radio channel measurements and phase 504 comprises the wireless communication device performing associated radio channel measurements.

Phase 505 comprises determining the wireless communications device 102 to be capable of performing radio channel measurements on radio channels to at least two different wireless communication networks. The wireless communications device may be reachable via the different wireless communication networks. In an example, the wireless communication networks, at least the wireless communication network 104, may obtain information indicating that the wireless communication device is connected to each of the wireless communication networks by a radio resource management protocol connection. Information of the radio resource management protocol connections may be obtained by information exchange, e.g. exchange of radio channel measurements, between the wireless communication networks.

In an example, phase 505 comprises that at least one of the wireless communication networks 104 determines that the wireless communication system supports DC, the wireless communication device is a Multi-SIM device or the wireless communication device is located within a coverage area of another wireless communication network 106, e.g. by wireless communication network supporting IEEE 802.11, LTE or 5G NR RAT.

In case the wireless communication system supports DC, a base station providing the master cell may have information of radio channel measurements performed in one or more secondary cells and/or information of base station site placements.

In case the wireless communication device is a Multi-SIM device, the wireless communication device 102 may send a message to the wireless communication network 104. The message may comprise information indicating the wireless communication device performing radio channel measurements on radio channels to at least two different wireless communication networks. On the other hand, it is viable that the wireless communication networks 104,106 exchange information of wireless communication devices that are connected to each wireless communication network, whereby the wireless communication networks may determine that the wireless communication device is capable of performing radio channel measurements on radio channels to at least two different wireless communication networks.

For example, in case the wireless communication device is located within a coverage area of another wireless communication network 106, e.g. a wireless communication network supporting IEEE 802.11, LTE or 5G NR RAT, the wireless communication device may send the wireless communication network 104 a message indicating that the wireless communication device is near or being served by the another wireless communication network, whereby the wireless communication network may determine on the basis of the message that the wireless communication device is capable of performing radio channel measurements on radio channels to at least two different wireless communication networks. It should be appreciated that the wireless communication device being located within a coverage area of another wireless communication network 106 may be detected automatically by the wireless communication network, for example by detecting that the wireless communication device is stationary.

Phase 506 comprises determining, by at least one of the wireless communication networks, an indication for relaxing radio channel measurements performed by the wireless communication device. In an example, the indication may be determined based on the wireless communication network determining the wireless communications device 102 to be capable of performing radio channel measurements on radio channels to at least two different wireless communication networks in phase 505.

Phase 508 comprises transmitting the indication to the wireless communication device.

In an embodiment, the indication comprises one or more of information indicating a reference radio channel and at least one associated radio channel of the radio channels connecting the wireless communication device to the wireless communication networks;

information related to the relationship;

information for controlling a measurement activity of the at least one associated radio channel on the basis of a relationship; and information for controlling a measurement reporting activity of the at least one second radio channel on the basis of the determined relationship.

An example of the information related to the relationship comprises information indicating whether the relationship should be constructed based on signal level and/or signal quality, and on ort more properties of the relationship. Examples of the properties of the relationship comprise error levels, e.g. mean error and/or standard deviation.

An example of the information for controlling the measurement activity comprises at least one or more parameters describing the relationship and/or an indicator for the wireless communication device to change the measurement activity. The parameters describing the relationship may comprise a mobility status, received power, received quality. The indicator for the wireless communication device to change the measurement activity may comprise indicate that the measurement activity should be changed when a mobility status of the wireless communication device is changed.

Phase 510 comprises relaxing a measurement activity of the at least one associated radio channel.

Phase 512 comprises monitoring whether the associated radio channel measurements performed during the relaxed measurement activity are in accordance with a relationship. The monitoring may be performed in accordance with one or more phases of the method of FIG. 3.

Phase 514 comprises performing, by the wireless communication device, reference radio channel measurements and phase 516 comprising performing, by the wireless communication device, associated radio channel measurements during the relaxed measurement activity.

Phase 518 comprises updating the relationship in accordance with phase 308 of FIG. 3, maintaining the measurement activity of the at least one associated radio channel in accordance with phase 306 of FIG. 3 and/or controlling the measurement activity of the at least one associated radio channel in accordance with phase 206 of FIG. 2.

Figure 6:
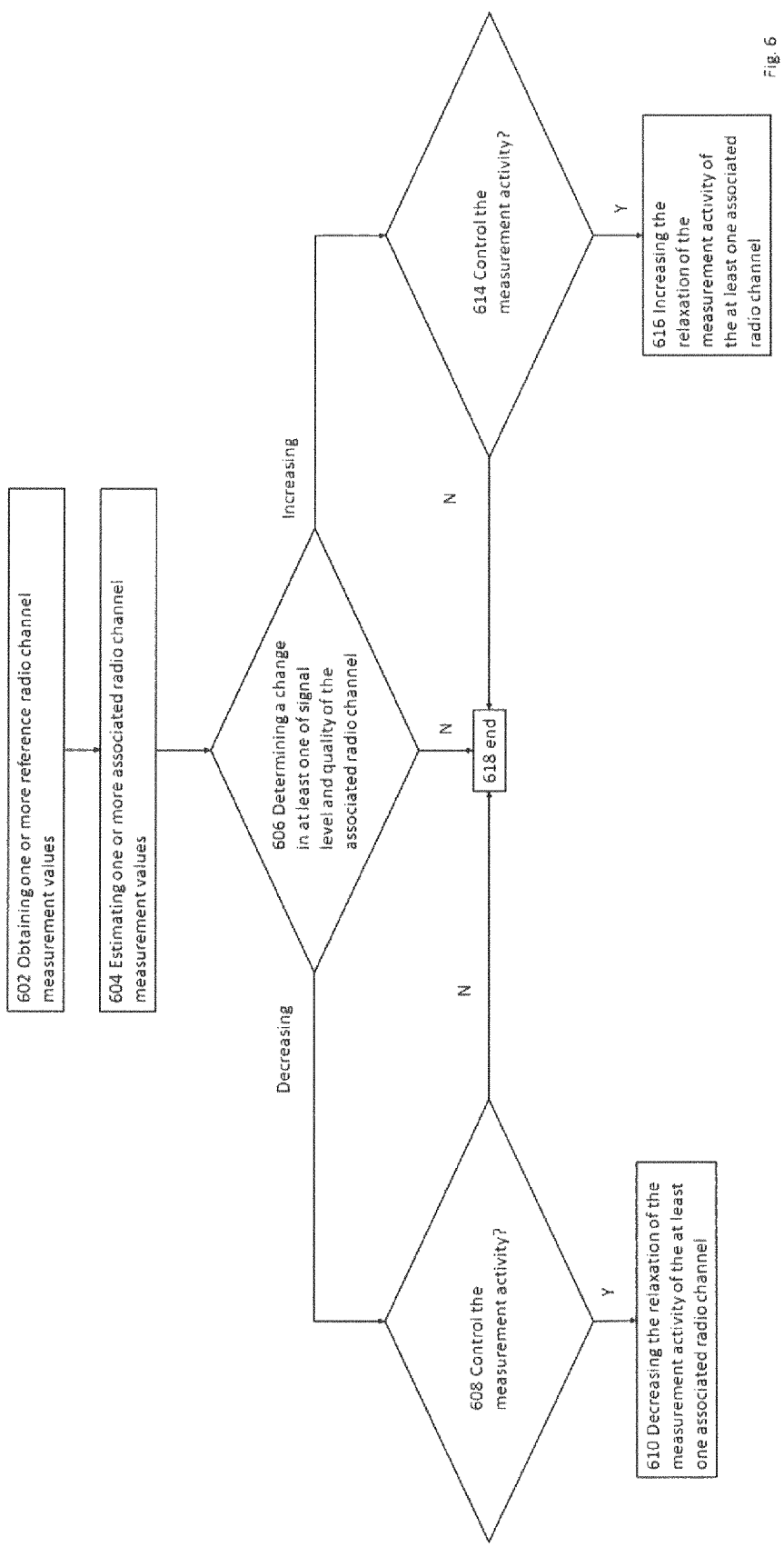
FIG. 6 illustrates an example of a method for controlling a measurement activity of at least one associated channel based on reference radio channel measurements in accordance with at least some embodiments of the present invention.

FIG. 6 illustrates an example of a method for controlling a measurement activity of at least one associated channel based on reference radio channel measurements in accordance with at least some embodiments of the present invention. The method may be performed by a wireless communication device described with FIG. 1 for example. The method of FIG. 6 provides one example of implementing the method of FIG. 4.

Phase 602 comprises obtaining one or more reference radio channel measurement values. The reference radio channel measurement values may be obtained in accordance with phase 202 of FIG. 2a, for example.

Phase 604 comprises estimating one or more associated radio channel measurement values on the basis of the relationship and reference radio channel measurements, in accordance with phase 402 FIG. 4. It should be appreciated that the reference radio channel measurements may be the reference radio channel measurements that have been performed in connection with determining the relationship or during a relaxed measurement activity of the at least one associated radio channel.

Phase 606 comprises determining, a change in at least one of signal level and quality of the associated radio channel, in accordance with phase 404 FIG. 4. If the change indicates a decrease of the at least one of the signal level and quality of the associated radio channel, the method proceeds to phase 608. If the change indicates an increase of the at least one of the signal level and quality of the associated radio channel, the method proceeds to phase 614.

Phase 608 comprises determining, on the basis of the decrease, to control the measurement activity, for example in accordance with phase 406 of FIG. 4. The amount of the decrease may be evaluated by comparing the decrease to a threshold value for determining whether the measurement activity should be controlled.

If it is determined in phase 608, to control the measurement activity, the method may proceed to phase 610 comprising decreasing the relaxation of the measurement activity of the at least one associated radio channel. In this way the measurement activity of the associated radio channel may be controlled in accordance with phase 408 of FIG. 4.

Phase 614 comprises determining, on the basis of the increase, to control the measurement activity, for example in accordance with phase 406 of FIG. 4. The amount of the increase may be evaluated by comparing the increase to a threshold value for determining whether the measurement activity should be controlled.

If it is not determined in phase 614, to control the measurement activity, the method may proceed to phase 616 comprising increasing the relaxation of the measurement activity of the at least one associated radio channel. In this way the measurement activity of the associated radio channel may be controlled in accordance with phase 408 of FIG. 4.

If it is not determined in phase 608 or 614 to control the measurement activity, or a change is not determined in phase 606, the method may proceed to end 618. It should be appreciated that after the method has ended, the method may start again from phase 602.

Figure 7:
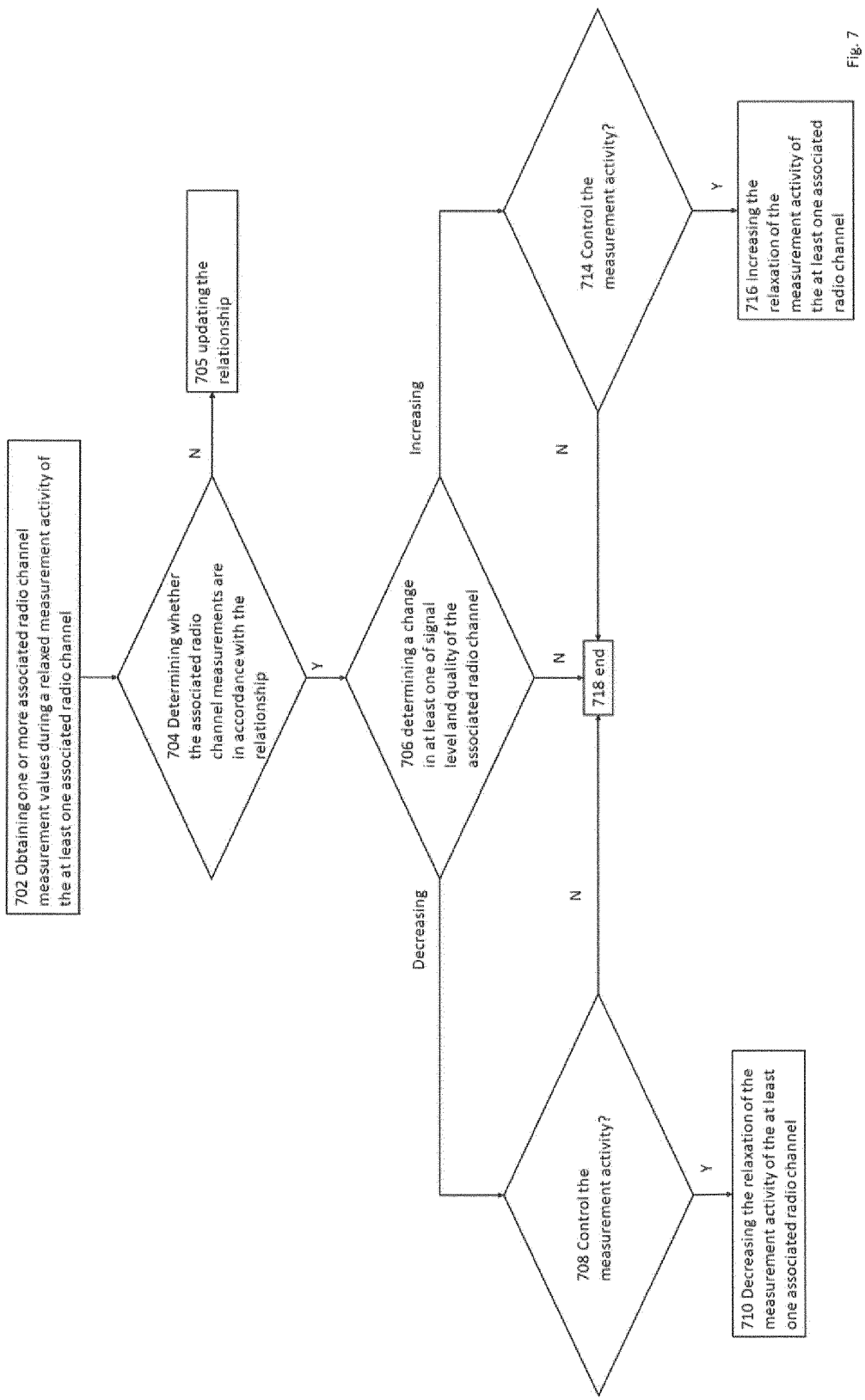
FIG. 7 illustrates an example of a method for controlling a measurement activity of at least one associated channel based on associated radio channel measurements in accordance with at least some embodiments of the present invention.

FIG. 7 illustrates an example of a method for controlling a measurement activity of at least one associated channel based on reference radio channel measurements in accordance with at least some embodiments of the present invention. The method may be performed by a wireless communication device described with FIG. 1 for example. The method of FIG. 7 provides one example of implementing the method of FIG. 4.

Phase 702 comprises obtaining one or more associated radio channel measurement values during a relaxed measurement activity of the at least one associated radio channel. The associated radio channel measurement values may be obtained in accordance with phase 202 of FIG. 2a, for example.

Phase 704 comprises determining whether the associated radio channel measurements are in accordance with the relationship, for example in accordance with phase 304 of FIG. 3. If the associated radio channel measurements performed during the relaxed measurement activity are in accordance with the relationship, the method may proceed to phase 706. In this way, validity of the relationship for performing the relaxed associated radio channel measurements may be evaluated.

If, in phase 704, the associated radio channel measurements performed during the relaxed measurement activity are not in accordance with the relationship, the method may proceed to phase 705, where the relationship may be updated. When the relationship is updated, the relationship may be determined anew, initialized or partially changed for performing relaxed associated radio channel measurements. The update may occur based on a relaxed measurement activity, a regular measurement activity, or an update specific setting of the measurement activity.

In an example, phase 704 comprises estimating one or more associated radio channel measurement values on the basis of the relationship and reference radio channel measurements performed during the relaxed measurement activity of the at least one associated radio channel. The estimated associated radio channel measurement values may be compared with actual associated radio channel measurement values that may be obtained by associated radio channel measurements in order to determine, whether the associated radio channel measurements performed during the relaxed measurement activity are in accordance with the relationship. It should be appreciated that the reference radio channel measurements may be the reference radio channel measurements that have been performed in connection with determining the relationship or during a relaxed measurement activity of the at least one associated radio channel.

Phase 706 comprises determining a change in at least one of signal level and quality of the associated radio channel, in accordance with phase 404 FIG. 4. If the change indicates a decrease of the at least one of the signal level and quality of the associated radio channel, the method proceeds to phase 708. If the change indicates an increase of the at least one of the signal level and quality of the associated radio channel, the method proceeds to phase 714.

Phase 708 comprises determining, on the basis of the decrease, to control the measurement activity, for example in accordance with phase 406 of FIG. 4.

If it is determined in phase 708, to control the measurement activity, the method may proceed to phase 710 comprising decreasing the relaxation of the measurement activity of the at least one associated radio channel. In this way the measurement activity of the associated radio channel may be controlled in accordance with phase 408 of FIG. 4.

Phase 714 comprises determining, on the basis of the increase, to control the measurement activity, for example in accordance with phase 406 of FIG. 4.

If it is determined in phase 714, to control the measurement activity, the method may proceed to phase 716 comprising increasing the relaxation of the measurement activity of the at least one associated radio channel. In this way the measurement activity of the associated radio channel may be controlled in accordance with phase 408 of FIG. 4.

If it is not determined in phase 708 or 714, to control the measurement activity or a change is not determined in phase 706, the method may proceed to end 718. It should be appreciated that after the method has ended, the method may start again from phase 702.

Figure 8:
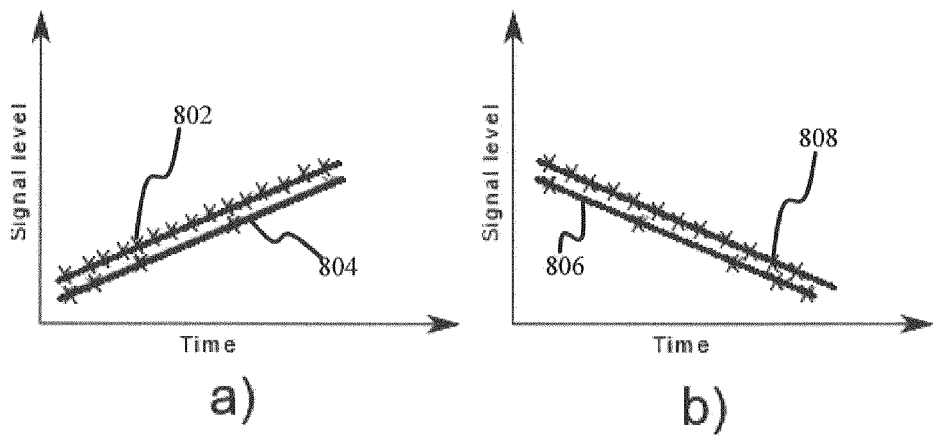
FIGS. 8, 9 and 10 illustrate examples of radio channel measurements and controlling a measurement activity of an associated radio channel in accordance with at least some embodiments of the present invention.
Figure 9:
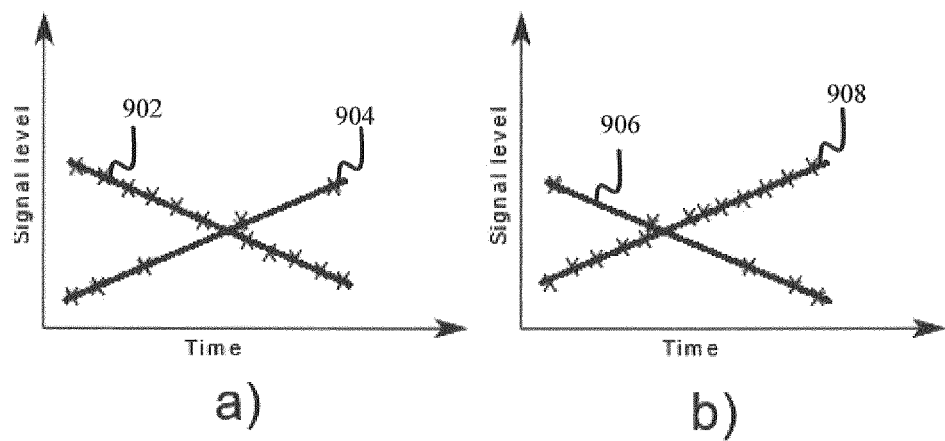
Figure 10:
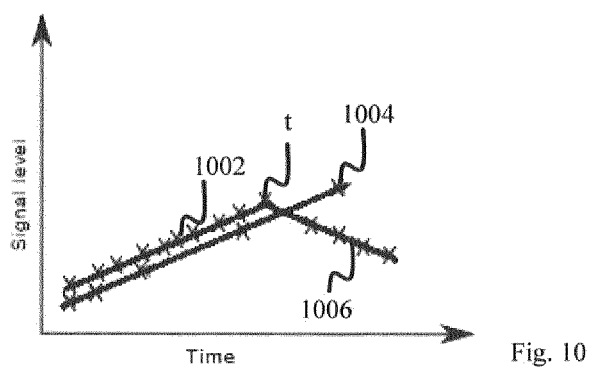

FIGS. 8, 9 and 10 illustrate examples of radio channel measurements and controlling a measurement activity of an associated radio channel in accordance with at least some embodiments of the present invention. The associated radio channel is associated to a reference radio channel and a relationship between the reference radio channels and the associated radio channel has been determined in accordance with phase 204 of FIG. 2.

FIGS. 8, 9 and 10 comprise plots of radio channel measurement values, where a radio signal level indicating a power level of the radio signal is illustrated on a vertical axis and time is illustrated on a horizontal axis. The measurement values are shown by 'X' for both a reference radio channel and an associated radio channel. FIGS. 8, 9 and 10 also illustrate regression lines for reference radio channels 802, 808,902,908,1002,1006 and for associated radio channels 804,806,904,906,1004 that are calculated for the measurement values of the reference radio channels and the measurement values of the associated radio channels. The regression lines are linear, whereby the measurement values of the reference radio channel and the measurement values of the associated radio channel may be determined to be in accordance with a linear relationship between the reference radio channel and the at least one associated radio channel, for example in phase 304 of FIG. 3.

In FIGS. 8, 9 and 10, controlling the measurement activity of an associated radio channel is illustrated by a distance along the time axis between associated radio channel measurement values. The distance illustrates time between associated radio channel measurements performed on the associated radio channel. In FIG. 8 *a*), FIG. 9 *a*) and FIG. 10, the distance between the associate radio channel measurement values is increased with time, whereby the relaxation of the measurement activity of the associated radio channel measurements is increased. In FIG. 8 *b*) and FIG. 9 *b*), the distance between the associate radio channel measurement values is decreased with time, whereby the relaxation the measurement activity of the associated radio channel measurements is decreased.

The examples illustrated in FIGS. 8, 9 and 10, are described using an example of a linear relationship between the reference radio channels and the associated radio channel. However, it should be appreciated that the relationship may be for example a non-linear relationship such as a higher order polynomial or other machine learning relevant algorithms. The linear relationship between the reference radio channel power level and the associated radio channel power level, may be expressed by $$P_{ass} = \beta_0 + \beta_1 P_{ref} + \epsilon \qquad (1),$$

where $P_{ass}$ is the associated power level calculated by the model using the reference radio channel input power level $P_{ref}$, $\beta_0$ is the y-intercept point which in this case defines the power level range of the relationship, $\beta_1$ defines the slope at which the associated radio channel power level change compared to the reference radio channel, and $\epsilon$ is the error term or error level between the reference radio channel power level and the associated radio channel power level which may be used as a property for determining whether the associated radio channel measurements are in accordance with the relationship. In this example of the relationship it may be assumed that the reference radio channel and associated radio channel measurement values are power levels, such that $P_{ref}$ denotes the reference radio channel power and $P_{ass}$ the associated radio channel power obtained radio resource measurement procedures. However, it should be appreciated that the values may be derived from various sources for example from L3 filtered measurements or raw signal power measurements. The advantage of the raw measurements is, that it might provide a larger dataset, however it may also have a greater variation on short term e.g. due to fast fading.

The relationship facilitates determining a mobility status of the wireless communication device for purposes of at least some embodiments of the present invention. For example, referring to formula (1), if the slope is $\beta_1 \approx 0$, then the wireless communication device has been stationary within the process of creating the reference and associated measurements for the model. In such a case, a deviation in $P_{ref}$ may indicate that the device may be moving, and that the relationship should be revised to reflect the actual relation between the associated radio channel measurements and reference radio channel measurements. The deviation may be detected if the associated radio channel measurements are not in accordance with the relationship. Then, the relationship may be revised or updated e.g. in phase 308 of FIG. 3. Accordingly, it should be appreciated that the revision may not have to be a complete update of the model using a new larger measurement set, but the device should at least ensure that a change in $P_{ass}$ reflects the change in $P_{ref}$.

FIG. 8 *a*) and *b*) illustrate examples, where referring to formula (1), the relationship has slope $\beta_1 \gg 0$. Then when the reference radio channel power level is increased also the associated radio channel power level is increased, which is illustrated in FIG. 8 *a*). On the other hand, when the reference radio channel power level is decreased also the associated radio channel power level is decreased, which is illustrated in FIG. 8 *b*).

Accordingly, in the situation of FIG. 8 *a*), where the reference radio channel measurement values are increasing, the mobility status may comprise the wireless communication device moving towards a stronger signal strength area, for example the wireless communication device may be moving towards a wireless communication network. Therefore, the measurement activity of the at least one associated radio channel may be controlled by decreasing the measurement activity, i.e. increasing the relaxation of the measurement activity.

Accordingly, in the situation of FIG. 8 *b*), where the reference radio channel measurement values are decreasing, the mobility status may comprise the wireless communication device moving away a stronger signal strength area, e.g. away from a wireless communication network. Therefore, the measurement activity of the at least one associated radio channel may be controlled by increasing the measurement activity, i.e. decreasing the relaxation of the measurement activity.

FIG. 9 *a*) and *b*) illustrate examples, where referring to formula (1), the relationship has slope $\beta_1 \ll 0$, the relation between the reference and associated measurement values is inverse. Then when the reference radio channel power level is decreased the associated radio channel power level is increased, which is illustrated in FIG. 9 *a*). On the other hand, when the reference radio channel power level is increased the associated radio channel power level is increased, which is illustrated in FIG. 9 *b*).

Accordingly, in the situation of FIG. 9 *a*), where the reference radio channel measurement values are decreasing, the mobility status may comprise the wireless communication device moving away from a stronger signal strength area, e.g. away from a wireless communication network. However, since the relationship has slope $\beta_1 \ll 0$, the measurement activity of the at least one associated radio channel may be controlled by decreasing the measurement activity, i.e. increasing the relaxation of the measurement activity.

Accordingly, in the situation of FIG. 9 *b*), where the reference radio channel measurement values are increasing, a mobility status may comprise the wireless communication device moving towards a stronger signal strength area, e.g. towards a wireless communication network. However, since the relationship has slope $\beta_1 \ll 0$, the measurement activity of the at least one associated radio channel may be controlled by increasing the measurement activity, i.e. decreasing the relaxation of the measurement activity.

Referring to FIG. 10, the reference radio channel measurement values are first increasing according to the regression line 1002 and the associated radio channel measurement values are also increasing. Then, after time 't', the reference radio channel measurement values start to follow a different regression line 1006. Since the regression lines prior to time T indicate that the relationship between the reference radio channel and the at least one associated radio channel have slope $\beta_1 \gg 0$, but after time instant 't' the regression liens indicate that the relationship between the reference radio channel and the at least one associated radio channel have slope $\beta_1 \ll 0$, it may be determined, for example in phase 304 of FIG. 3, that the associated radio channel measurements are not in accordance with the relationship or vice versa that the relationship is not in accordance with the associated radio channel measurements. Then the relationship may be initialized for example in accordance with phase 308 such that the associated radio channel may be relaxed according to an updated or new relationship.

It should be appreciated that the example of the relationship given in formula (1) and the reference radio channel measurement values and associated radio channel measurement values illustrated in FIGS. 8, 9 and 10 are only examples and in practice the relation between the reference radio channel and the associated radio channel measurements may be different. For example, the reference radio channel power level and the associated radio channel power level may not necessarily increase and decrease at the same rate, for instance if different frequency ranges are used.

Figure 11:
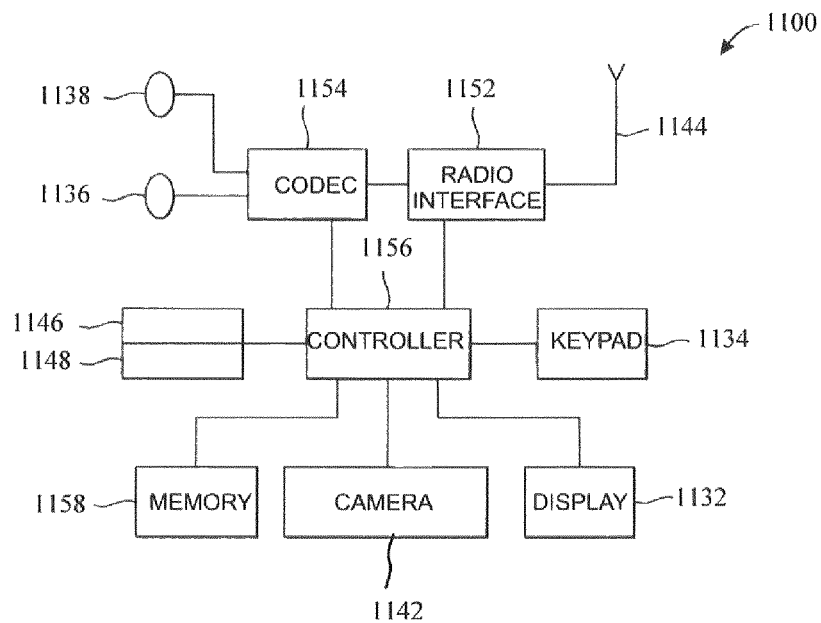
FIG. 11 illustrates an example of an apparatus capable of supporting at least some embodiments of the present invention.
Figure 12:
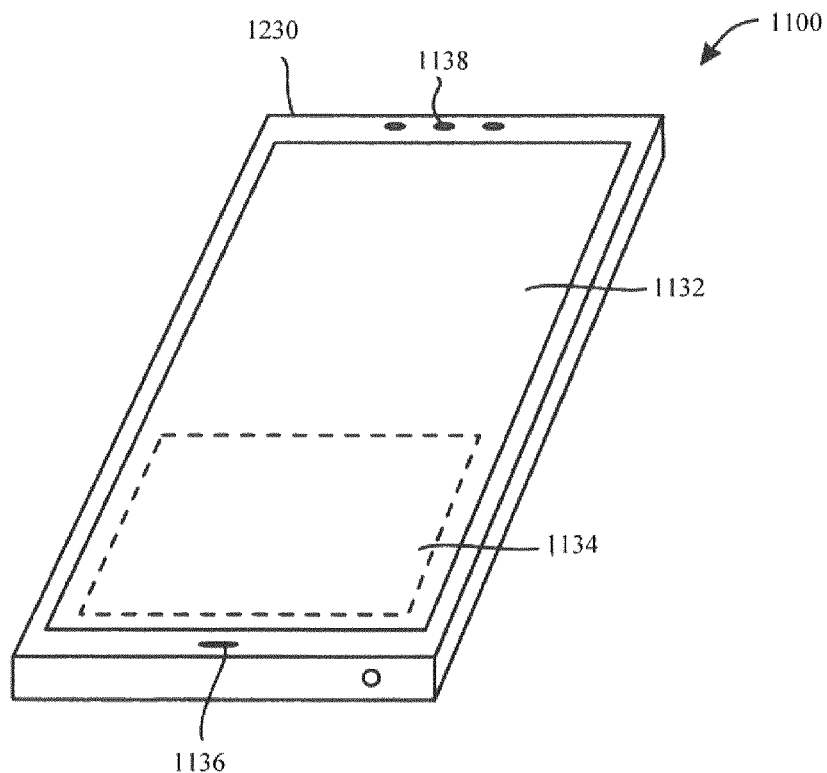
FIG. 12 illustrates an example of a wireless communication device capable of supporting at least some embodiments of the present invention.

FIG. 11 illustrates an example of an apparatus capable of supporting at least some embodiments of the present invention. FIG. 12 illustrates an example of a wireless communication device capable of supporting at least some embodiments of the present invention. In FIG. 11 the apparatus may be an electronic device 1100 illustrated by a block diagram.

The electronic device 1100 may for example be a mobile terminal, user equipment or a wireless communication device of a communication system, for example the communication system described with FIG. 1. However, it would be appreciated that embodiments of the invention may be implemented within any electronic device or apparatus which may utilize RRM measurements.

The electronic device 1100 may comprise a housing 1230 for incorporating and protecting the device. The electronic device 1100 further may comprise a display 1132 in the form of a liquid crystal display. In other embodiments of the invention the display may be any suitable display technology suitable to display an image or video. The electronic device 1100 may further comprise a keypad 1134. In other embodiments of the invention any suitable data or user interface mechanism may be employed. For example the user interface may be implemented as a virtual keyboard or data entry system as part of a touch-sensitive display.

The electronic device may comprise a microphone 1136 or any suitable audio input which may be a digital or analogue signal input. The electronic device 1100 may further comprise an audio output device which in embodiments of the invention may be any one of: an earpiece 1138, speaker, or an analogue audio or digital audio output connection. The electronic device 1100 may also comprise a battery (or in other embodiments of the invention the device may be powered by any suitable mobile energy device such as solar cell, fuel cell or clockwork generator). The electronic device may further comprise a camera 1142 capable of recording or capturing images and/or video. The electronic device 1100 may further comprise an infrared port for short range line of sight communication to other devices. In other embodiments the electronic device 1100 may further comprise any suitable short range communication solution such as for example a Bluetooth wireless connection or a USB/firewire wired connection.

The electronic device 1100 may comprise a controller 1156, processor or processor circuitry for controlling the electronic device 1100. The controller 1156 may be connected to memory 1158 which in embodiments of the invention may store both data in the form of image and audio data and/or may also store instructions for implementation on the controller 1156. The controller 1156 may further be connected to codec circuitry 1154 suitable for carrying out coding and decoding of audio and/or video data or assisting in coding and decoding carried out by the controller.

The electronic device 1100 may further comprise a card reader 1148 and a smart card 1146, for example a UICC and UICC reader for providing user information and being suitable for providing authentication information for authentication and authorization of the user at a network.

The electronic device 1100 may comprise radio interface circuitry 1152 connected to the controller and suitable for generating wireless communication signals for example for communication with a cellular communication network, a communication system. The electronic device 1100 may further comprise an antenna 1144 connected to the radio interface circuitry 1152 for transmitting radio frequency signals generated at the radio interface circuitry 1152 to other apparatus(es) and for receiving radio frequency signals from other apparatus(es).

The electronic device 1100 may comprise a camera capable of recording or detecting individual frames which are then passed to the codec 1154 or the controller for processing. The electronic device may receive the video image data for processing from another device prior to transmission and/or storage. The electronic device 1100 may also receive either wirelessly or by a wired connection the image for coding/decoding. The structural elements of electronic device 1100 described above represent examples of means for performing a corresponding function.

According to an example, the electronic device 1100 is a wireless communication device comprising means for performing first radio channel measurements on a first radio channel of a first wireless communication network and second radio channel measurements on at least one second radio channel of a second wireless communication network, means for determining, on the basis of the first radio channel measurements and the second radio channel measurements, a relationship between the first radio channel measurements and the at least one second radio channel measurements, means for controlling a measurement activity of the at least one second radio channel on the basis of at least the determined relationship and the first radio channel measurements.

According to an example the means of the wireless communication device comprises at least one processor; and at least one memory including computer program code, the at least one memory and computer program code configured to, with the at least one processor, cause the performance of the wireless communication device.

Figure 13:
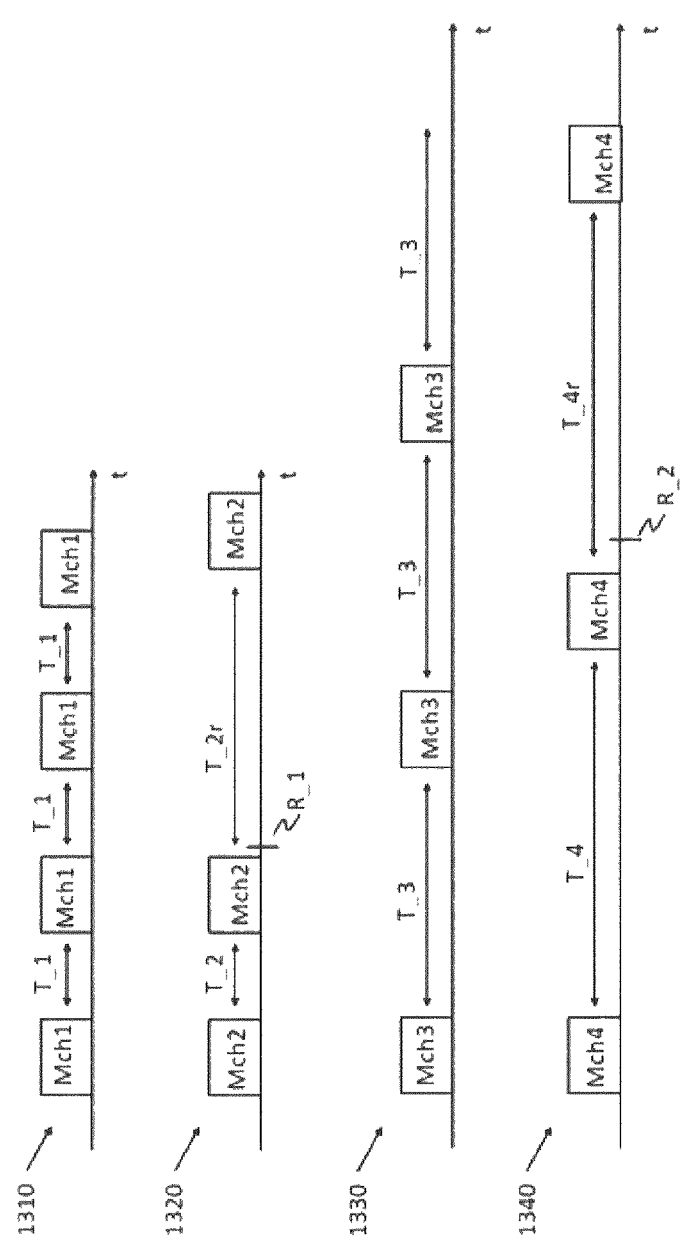
FIG. 13 illustrates an example of radio channel measurements in accordance with at least some embodiments of the present invention.

FIG. 13 illustrates examples of radio channel measurements in accordance with at least some embodiments of the present invention. A measurement activity of a radio channel may be determined based on a state of a radio resource management protocol of the radio channel. The radio channel may be one of at least two radio channels of a wireless communications device.

In FIG. 13, the radio channel measurements are illustrated on time axes. The measurements are shown in two scenarios. In a first scenario, a state of the radio resource management protocol on the radio channels 1310, 1320 is active and in a second scenario the state of the radio resource management protocol on the radio channels 1330, 1340 is idle.

In the first scenario, the wireless communication device performs radio channel measurements, Mch1, on one radio channel 1310 with a periodicity of time T_1, and radio channel measurements, Mch2, on at least one other radio channel 1320 with a periodicity of time T_2. At time R_1 in the first scenario, a measurement activity of the at least one other radio channel 1320 is relaxed. In this example, the measurement activity is relaxed by increasing the time between radio channel measurements performed on the at least one other radio channel and the periodicity of the radio channel measurements is increased to time T_2r between the radio channel measurements, Mch2.

In the second scenario, the wireless communication device performs radio channel measurements, Mch3, on one radio channel 1330 with a periodicity of time T_3, and radio channel measurements, Mch4, on at least one other radio channel 1340 with a periodicity of time T_4. At time R_2 in the second scenario, a measurement activity of the at least one other radio channel 1340 is relaxed. In this example, the measurement activity is relaxed by increasing the time between radio channel measurements performed on the at least one other radio channel and the periodicity of the radio channel measurements is increased to time T_4r between the radio channel measurements, Mch4.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Drawings may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be a computer readable medium that may be non-transitory. The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

LIST OF REFERENCE SIGNS

100 Communication system
102 Wireless communication device
104,106 Wireless communication network
108,110,112 Radio channel
114,116 Coverage area
202-206 Phases of FIG. 2a
208-214 Phases of FIG. 2b
302-308 Phases of FIG. 3
402-408 Phases of FIG. 4
502-518 Phases of FIG. 5
602-616 Phases of FIG. 6
702-716 Phases of FIG. 7
802,808,902,908,1002,
1006 Regression lines for reference radio channels in FIGS. 8, 9 and 10
804,806,904,906,1004 Regression lines for associated radio channels in FIGS. 8, 9 and 10
t time instant in FIG. 10
1100 Electronic device
1132 Display
1134 Keypad
1138 Earpiece
1136 Microphone
1142 Camera
1144 Antenna
1146 Smart card
1148 Card reader
1152 Radio interface circuitry
1154 Codec circuitry
1156 Controller
1158 Memory
1230 Housing List of Acronyms 5G NR 5$^{th}$ Generation mobile network New Radio
CD Compact Disc CDMA Code Division Multiple Access
DC Dual Connectivity
DVD Digital Versatile Disc
GSM Global System for Mobile communications
LTE Long Term Evolution
Mch1 Radio channel measurement
Mch1 Radio channel measurement
Mch3 Radio channel measurement
Mch4 Radio channel measurement
ME Mobile Equipment
PDA Personal Digital Assistant
PLMN ID Public Land Mobile Network Identifier
RAT Radio Access Technology
RF Radio Frequency
RSRP Reference Signal Received Power
RSRQ Reference Signal Received Quality
SIM Subscriber Identification Module
T_1 Time between radio channel measurements
T_2 Time between radio channel measurements
T_2r Relaxed time between radio channel measurements
T_3 Time between radio channel measurements
T_4r Relaxed time between radio channel measurements
UE User Equipment
UMTS Universal Mobile Telecommunications System
USIM User Services Identity Module
WCN1 Wireless communication network 1
WCN2 Wireless communication network 2

The invention claimed is:

1. A wireless communication device, comprising:
at least one processor; and
at least one memory including computer program code;
the at least one memory and the computer program code configured to, with the at least one processor, cause the wireless communication device at least to:
    perform first radio channel measurements on a first radio channel of a first wireless communication network and second radio channel measurements on at least one second radio channel of a second wireless communication network;
    determine, on the basis of the first radio channel measurements and the second radio channel measurements, a relationship between the first radio channel measurements and the at least one second radio channel measurements;
    control a measurement activity of the at least one second radio channel on the basis of at least the determined relationship and the first radio channel measurements;
    estimate one or more second radio channel measurement values on the basis of the determined relationship and the first radio channel measurements;
    determine a change in at least one of signal level and quality of the second radio channel; and
    control the measurement activity of the at least one second radio channel on the basis of the determined change.

2. The wireless communication device according to claim 1, wherein the at least one processor and the computer program code are configured to cause the wireless communication device to:
    determine at least one property of the determined relationship; and
    control the measurement activity of the at least one second radio channel, if the determined property meets at least one criterion.

3. The wireless communication device according to claim 2, wherein the at least one property comprises an error level of second radio channel measurement values estimated on the basis of the determined relationship.

4. The wireless communication device according to claim 3, wherein the at least one processor and the computer program code are configured to cause the wireless communication device to:
    determine a deviation between the second radio channel measurements and the second radio channel measurement values estimated on the basis of the relationship; and
    determine whether the second radio channel measurements are in accordance with the relationship based on the determined deviation and the error level.

5. The wireless communication device according to claim 1, wherein the at least one processor and the computer program code are configured to cause the wireless communication device to:
    relax a measurement activity of the at least one second radio channel on the basis of at least the determined relationship and the first radio channel measurements.

6. The wireless communication device according to claim 1, wherein the at least one processor and the computer program code are configured to cause the wireless communication device to:
    increase the measurement activity of the at least one second radio channel on the basis of at least the determined relationship and the first radio channel measurements.

7. The wireless communication device according to claim 1, wherein the at least one processor and the computer program code are configured to cause the wireless communication device to:
    determine whether one or more of the performed second radio channel measurements are in accordance with the determined relationship, and if they are, maintaining the measurement activity of the at least one second radio channel at a current level of the measurement activity, if they are not, updating the determined relationship.

8. The wireless communication device according to claim 7, wherein the at least one processor and the computer program code are configured to cause the wireless communication device to:
    determine a mobility status of the wireless communication device on the basis of the determined relationship and at least one of the first radio channel measurements and the at least one second radio channel measurements;
    and based on the determination of a mobility status change,
    determine whether the one or more of the performed second radio channel measurements are in accordance with the determined relationship.

9. The wireless communication device according to claim 1, wherein the at least one processor and the computer program code are configured to cause the wireless communication device to:
    determine whether to control the measurement activity of the at least one second radio channel on the basis of the determined change.

10. The wireless communication device according to claim 1, wherein the at least one processor and the computer program code are configured to cause the wireless communication device to:
    control the measurement activity if one or more estimated second radio channel measurement values meet an absolute threshold.

11. The wireless communication device according to claim 1, wherein the measurement activity comprises at least one of a periodicity of the second radio channel measurements, a number of neighboring cells to measure by the second radio channel measurements, a number of beams to measure by the second radio channel measurements and a number of frequency carriers to measure by the second radio channel measurements.

12. The wireless communication device according to claim 1, wherein the measurement activity is determined based on a state of a radio resource management protocol.

13. The wireless communication device according to claim 1, wherein the at least one processor and the computer program code are configured to cause the wireless communication device to:
receive from the first wireless communication network or the second wireless communication network an indication comprising one or more of:
information indicating the at least one second radio channel and the first radio channel;
information related to the relationship;
information for controlling the measurement activity of the at least one second radio channel on the basis of the determined relationship; and
information for controlling a measurement reporting activity of the at least one second radio channel on the basis of the determined relationship.

14. The wireless communication device according to claim 1, wherein the wireless communication device comprises a first user equipment configured to connect over the first radio channel to the first wireless communication network and a second user equipment configured to connect over the at least one second radio channel to the second wireless communication network.

15. The wireless communication device according to claim 1, wherein the first wireless communication network and the second wireless communication network are of the same network.

16. The wireless communication device according to claim 1, wherein the wireless communication device is connected over the first radio channel to a master cell of the first wireless communication network and over the second radio channel to a secondary cell of the second wireless communication network.

17. A method for a wireless communications device, comprising:
performing first radio channel measurements on a first radio channel of a first wireless communication network and second radio channel measurements on at least one second radio channel of a second wireless communication network;
determining, on the basis of the first radio channel measurements and the second radio channel measurements, a relationship between the first radio channel measurements and the at least one second radio channel measurements;
controlling a measurement activity of the at least one second radio channel on the basis of at least the determined relationship and the first radio channel measurements;
estimating one or more second radio channel measurement values on the basis of the determined relationship and the first radio channel measurements;
determining a change in at least one of signal level and quality of the second radio channel; and
controlling the measurement activity of the at least one second radio channel on the basis of the determined change.

18. The method according to claim 17, comprising:
determining at least one property of the determined relationship; and
controlling the measurement activity of the at least one second radio channel, if the determined property meets at least one criterion.

19. The method according to claim 18, wherein the at least one property comprises an error level of second radio channel measurement values estimated on the basis of the determined relationship.

20. The method according to claim 19, comprising:
determining a deviation between the second radio channel measurements and the second radio channel measurement values estimated on the basis of the relationship;
determining whether the second radio channel measurements are in accordance with the relationship based on the determined deviation and the error level.

21. The method according to claim 17, comprising:
relaxing a measurement activity of the at least one second radio channel on the basis of at least the determined relationship and the first radio channel measurements.

22. The method according to claim 17, comprising:
increasing the measurement activity of the at least one second radio channel on the basis of at least the determined relationship and the first radio channel measurements.

23. The method according to claim 17, comprising:
determining whether one or more of the second radio channel measurements are in accordance with the determined relationship, and if they are, maintaining the measurement activity of the at least one second radio channel at a current level of the measurement activity, if they are not, updating the determined relationship.

24. The method according to claim 23, comprising:
determining a mobility status of the wireless communication device on the basis of the determined relationship and at least one of the first radio channel measurements and the at least one second radio channel measurements;
wherein whether the one or more of the performed second radio channel measurements are in accordance with the determined relationship is determined on the basis of the mobility status.

25. The method according to claim 17, comprising:
determining whether to control the measurement activity of the at least one second radio channel on the basis of the determined change.

26. The method according to claim 17, comprising: controlling the measurement activity if one or more estimated second radio channel measurement values meet an absolute threshold.

27. The method according to claim 17, wherein the measurement activity comprises at least one of a periodicity of the second radio channel measurements a number of neighboring cells to measure by the second radio channel measurements the second radio channel measurements, a number of beams to measure by the second radio channel measurements and a number of frequency carriers to measure by the second radio channel measurements.

28. A wireless communication device, comprising:
at least one processor; and
at least one memory including computer program code;

the at least one memory and the computer program code configured to, with the at least one processor, cause the wireless communication device at least to:
   perform first radio channel measurements on a first radio channel of a first wireless communication network and second radio channel measurements on at least one second radio channel of a second wireless communication network;
   determine, on the basis of the first radio channel measurements and the second radio channel measurements, a relationship between the first radio channel measurements and the at least one second radio channel measurements;
   determine an error level of second radio channel measurement values estimated on the basis of the determined relationship; and
   control the measurement activity of the at least one second radio channel, if the determined error level meets at least one criterion.

29. A wireless communication device, comprising:
   at least one processor; and
   at least one memory including computer program code;
the at least one memory and the computer program code configured to, with the at least one processor, cause the wireless communication device at least to:
   perform first radio channel measurements on a first radio channel of a first wireless communication network and second radio channel measurements on at least one second radio channel of a second wireless communication network;
   determine, on the basis of the first radio channel measurements and the second radio channel measurements, a relationship between the first radio channel measurements and the at least one second radio channel measurements; and
   determine whether one or more of the performed second radio channel measurements are in accordance with the determined relationship, and if they are, maintaining the measurement activity of the at least one second radio channel at a current level of the measurement activity, if they are not, updating the determined relationship.

* * * * *